United States Patent

Kronbauer et al.

[11] Patent Number: 5,283,603
[45] Date of Patent: Feb. 1, 1994

[54] SLIDE MAGAZINE

[75] Inventors: Hermann Kronbauer, Aschheim; Christian Rehm, Munich, both of Fed. Rep. of Germany

[73] Assignee: reflecta GmbH foto film projektion, Schwabach, Fed. Rep. of Germany

[21] Appl. No.: 926,303

[22] Filed: Aug. 10, 1992

[30] Foreign Application Priority Data

Aug. 22, 1991 [EP] European Pat. Off. ......... 91114041.6

[51] Int. Cl.⁵ ............................................. G03B 23/14
[52] U.S. Cl. ..................... 353/114; 353/118; 211/41
[58] Field of Search ............... 353/114, 116, 118, 120; 206/456; 211/41

[56] References Cited

U.S. PATENT DOCUMENTS

| 3,830,566 | 8/1974 | Bennett | 353/116 |
| 4,700,846 | 10/1987 | Schroder | 211/41 |

FOREIGN PATENT DOCUMENTS

| 0019698 | 12/1980 | European Pat. Off. . |
| 2025653 | 12/1971 | Fed. Rep. of Germany . |
| 2817005 | 9/1979 | Fed. Rep. of Germany ...... 353/116 |
| 2914922 | 10/1980 | Fed. Rep. of Germany ...... 353/116 |
| 1519086 | 3/1968 | France . |
| 2094498 | 9/1982 | United Kingdom . |

Primary Examiner—David T. Fidei
Attorney, Agent, or Firm—Bachman & LaPointe

[57] ABSTRACT

A slide magazine for slide frames having a peripheral edge with a peripherally extending groove on the two faces thereof and a notch at at least one edge portion of the peripheral edge, comprises a base portion with longitudinally spaced pairs of transverse rib portions. The rib portions of each pair are disposed in alignment transversely to the base portion and each pair is spaced from an adjacent pair to provide a slide frame-receiving compartment. The rib portions carry retaining ribs to hold the respective slide frame in a spill-resistant manner in the slide magazine, and each rib portion further has a projection for engaging into the groove to hold the respective slide frame in its compartment. A resilient finger in the base of each compartment has a retaining nose to engage into the notch of the slide frame to hold it in position. Slide frames can thus be inserted into and removed from the slide magazine at both sides thereof.

7 Claims, 2 Drawing Sheets

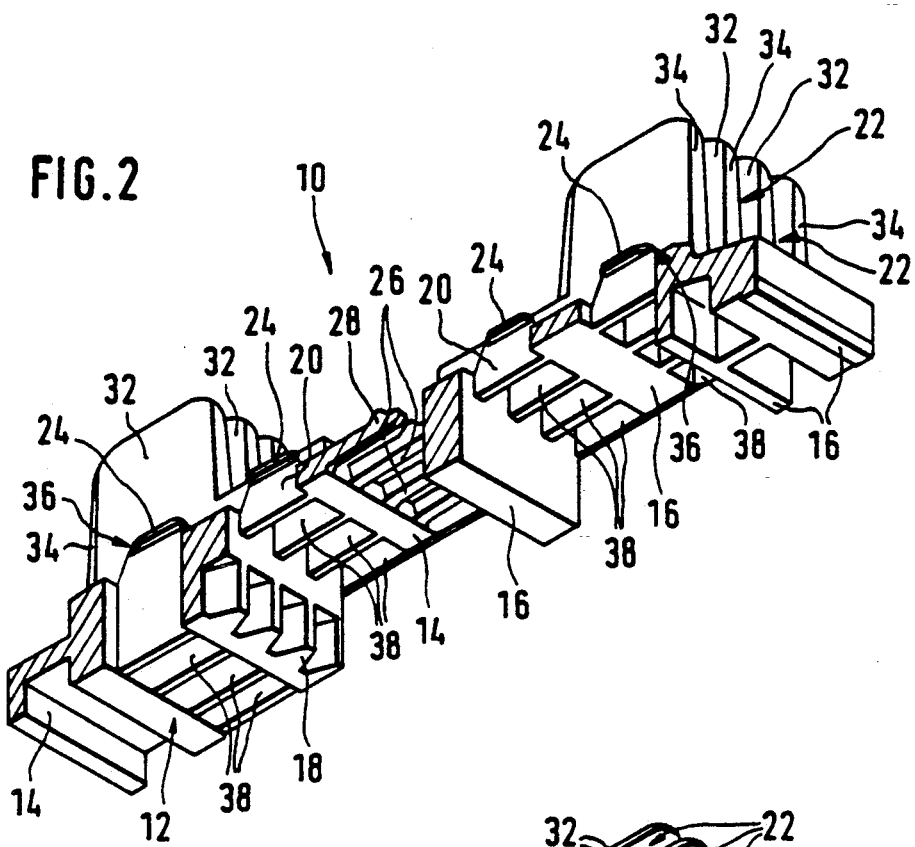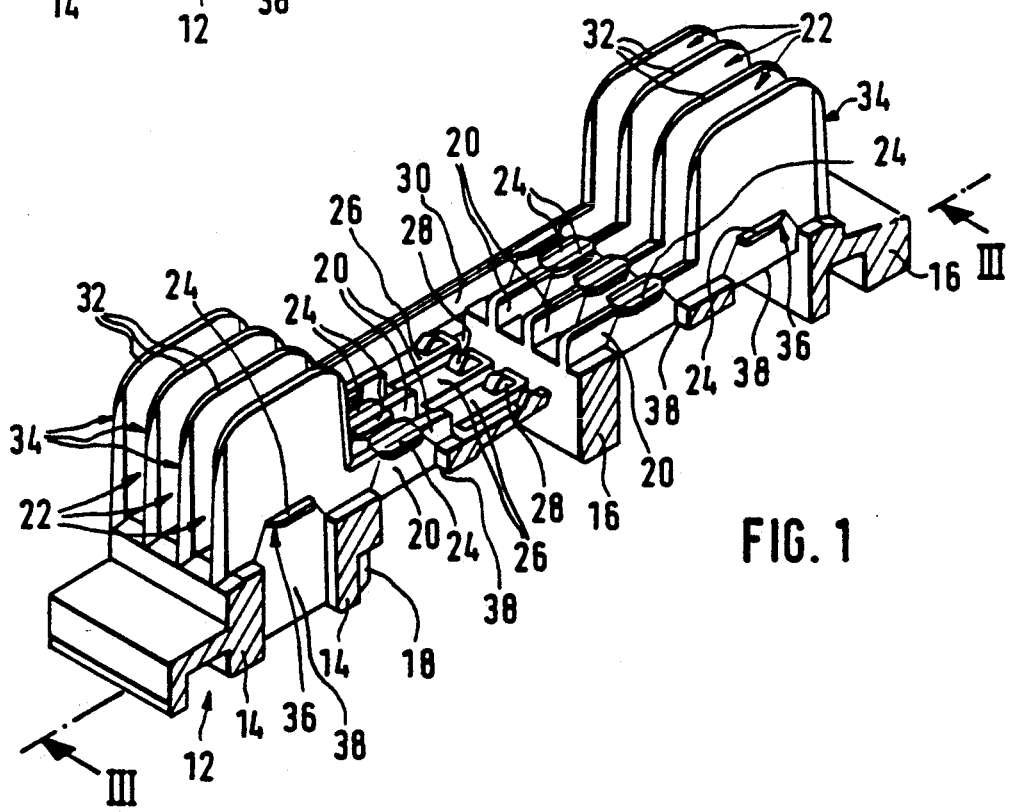

SLIDE MAGAZINE

BACKGROUND OF THE INVENTION

Slide magazines for slide frames such as those referred to as CS-slide frames, which have a peripherally extending groove configuration along the peripheral edge of the slide frame on the two sides thereof, and a notch at each edge portion of the peripheral edge, typically comprise a base portion carrying a plurality of spaced-apart transverse ribs defining respective compartments each for accommodating a respective slide frame. At least one projection which is arranged to engage into a groove in the respective slide frame projects laterally away from each transverse rib and the base portion has spaced-apart resilient fingers which are associated with a respective compartment and each of which is provided with an upwardly projecting retaining nose f or engaging into the notch in the corresponding slide frame. Retaining ribs which are aligned with the transverse ribs project upwardly from the base portion to hold the slide frames in a spill-resistant fashion. The retaining ribs of such a slide magazine project into the interior of the slide magazine from a lateral longitudinal wall thereof. By virtue of the presence of that side wall, which extends along the slide magazine, it is only possible for the slide frames which are held in a spill-resistant fashion in the slide magazine to be removed therefrom at one side. In that arrangement, the slide frames are held in the slide magazine in a spill-resistant fashion by virtue of the action of the retaining noses on the resilient fingers and the -lateral projections which project away from the transverse ribs in the longitudinal direction of the slide frame and which engage into the corresponding groove configurations in the respective slide frame. The retaining noses on the resilient fingers and the notches at the corresponding edge portion of the peripheral edge of the slide frame provide a safeguard to prevent the slide frame in a compartment from being accidentally laterally displaced out of the slide magazine.

SUMMARY OF THE INVENTION

An object of the present invention is to provide a slide magazine which can be loaded and unloaded with slide frames not just from one side but from either side thereof.

Another object of the present invention is to provide a slide magazine for so-called CS-slide frames, which is of such a design configuration as to afford ease of manufacture while nonetheless securely retaining slide frames therein.

Still another object of the present invention is to provide a slide magazine for CS-slide frames which is so designed as to ensure that the slide frames are reliably guided into the respective compartments of the slide magazine and securely held therein.

In accordance with the principles of the present invention, the foregoing and other objects are achieved by a slide magazine for slide frames having a peripheral edge with a peripherally extending groove configuration on the two sides thereof, and a notch at at least one edge portion of the peripheral edge, the slide magazine having an elongate base portion on which a plurality of rib weans are disposed, transversely of the base portion, at spacings from each other in the longitudinal direction of the base portion, thereby forming compartments for accommodating respective slide frames. Each transverse rib means comprises rib portions which are separated from each other in the transverse direction of the base portion and each transverse rib portion has at least one projection which projects laterally therefrom and is arranged to engage into the groove configuration of the respective slide frame. A plurality of resilient fingers is disposed on the base portion at spacings from each other in the longitudinal direction of the base portion, each finger being operatively associated with a respective compartment. Each finger carries a retaining nose which projects away from the base portion, for engaging into a notch of the respective slide frame. The corresponding retaining nose of each compartment is disposed between the respective rib portions associated therewith and the retaining noses which are aligned with each other i-n the longitudinal direction of the slide magazine form an axis of symmetry along which the transverse rib portions are arranged. Retaining ribs are disposed on respective ones of the oppositely arranged transverse rib portions and aligned therewith and project upwardly away from the base portion, for holding the respective slide frames in the slide magazine in a spill-resistant manner.

It will be seen therefore that, in the configuration of the slide magazine according to the present invention, the retaining ribs do not project away from a side wall which extends in the longitudinal direction of the slide magazine, as in the case of the typical slide magazines initially discussed, but rather the retaining ribs project away from the first and second transverse rib portions which are disposed in mutually opposite relationship, relative to the longitudinally extending axis of s@try. That means that the slide magazine according to the invention does not have a side wall whereby the CS-slide frames with peripherally extending groove configurations and central notches can be removed from the slide magazine at both sides thereof. A similar point applies in regard to arranging such slide frames in the slide magazine, as they can also be inserted from both sides thereof. A slide magazine of this kind is intended more particularly for a slide projector as is described for example in EP patent application Ser. No. 91 114 039.0 reference is accordingly directed for appropriate incorporation of the content thereof into the present specification for the purpose of full comprehension. It will further be appreciated that the slide magazine according to the present invention can also be used in conventional slide projectors which are suitable only for removal of slide frames from the slide magazine at one side thereof.

In a preferred feature of the invention, the or each retaining rib and the associated transverse rib portion may form a common outside edge, in order in that way to provide that the individual slide frames can be arranged and retained in the slide magazine in a simple fashion, without causing difficulties, and without involving a great amount of time.

In accordance with a preferred feature of the invention, for the same purpose, each outside edge may be of an at least substantially knife-edge configuration. That provides a certain guidance and centering action for each individual slide frame.

In still another preferred feature of the invention, each retaining rib, as viewed in the transverse direction of the slide magazine, is of a widthwise dimension which is less than the length of the corresponding transverse rib portion on which it can be formed as by molding on one side thereof. That can provide for a saving in material. On the other hand however, that arrangement has the advantage of not adversely affecting retention of the individual slide frames disposed in the slide magazine because the associated retaining ribs which are disposed laterally in opposite relationship are at a spacing from each other which is adapted to or corresponds to the length of the edge portion of the peripheral edge of the f or example square slide frame.

In another preferred feature of the slide magazine according to the invention, projecting away from each transverse rib portion on each side thereof are first and second spaced-apart projections, one of which is provided as by molding in the region of the associated retaining rib while the other is in the region of a part, which is free of a retaining rib, of the corresponding transverse rib portion. That configuration provides for secure and reliable guidance of the slide frame in a compartment of the slide magazine and also secure and reliable retention thereof in the slide magazine compartment.

In accordance with still another preferred feature of the invention, each above-mentioned projection which projects from each transverse rib portion has a chamfer or bevel at its end part which is towards the outside edge of the respective transverse rib portion and retaining rib, thereby to provide that for example an CS-slide frame which is to be inserted into the slide magazine is guided in a precise and tilt-free fashion.

Preferably, each projection which has a chamfer or bevel converging into the compartment is displaced into the interior of the slide magazine relative to the corresponding outside edge of the transverse rib portion and the retaining rib. When a CS-slide frame is inserted or pushed into a corresponding compartment of the slide magazine, that design configuration firstly ensures that the slide frame is guided by the outside edge of the transverse rib portion and the retaining rib portion, while subsequently the chamfer or bevel configurations of the projections which project into the corresponding groove configuration of the slide frame then afford a precise guidance effect. While such a slide frame is being inserted into one of the compartments of the slide magazine, the resilient finger which is operatively associated with that compartment is resiliently urged downwardly towards the base portion, with its upwardly projecting retaining nose, until the retaining nose has engaged into the central notch in the corresponding edge portion of the peripheral edge of the slide frame.

Further objects, features and advantages of the present invention will be apparent from the following description of a preferred embodiment.

BRIEF DESCRIPTION OF THE DRAWING

FIG. 1 is a perspective view of an end part of a slide magazine according to the invention, viewing inclinedly downwardly on to the slide magazine, FIG. 2 is a perspective view of the end part of the slide magazine as shown in FIG. 1, viewing inclinedly upwardly.

DESCRIPTION OF THE PREFERRED EMBODIMENT

Figure 5:
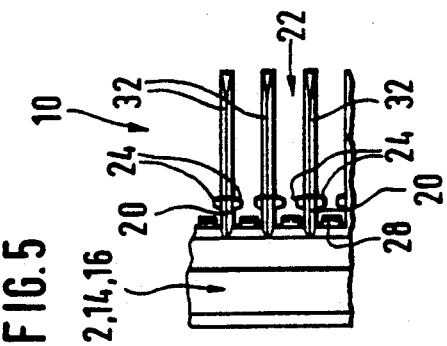
FIG. 5 shows a view of part of the slide magazine in FIG. 4 viewing from the side indicated by the arrow V.

Reference will now be made to FIGS. 1 through 5 in which the same parts are denoted by the same reference numerals.

Looking firstly at the perspective view in FIG. 1, shown therein is an end part of a slide magazine according to the present invention, which is designed in this case more especially for what are known as CS-slide frames, and from which slide frames can be removed both at one side and at both sides thereof. The slide magazine as indicated generally at 10 comprises an elongate base portion 12, in which respect it will be appreciated that only a part thereof is shown here. The underneath configuration of the base portion 12 can be particularly clearly seen from FIG. 2. It comprises longitudinal elements indicated at 14 and 16 which together form a unit and which are joined to provide the base portion 12. FIG. 2 also shows for example that the longitudinal element 14 has a configuration providing a toothed rack 18 into which engages a gear on a slide projector so that the slide magazine 10 can be moved forwards or backwards in its longitudinal direction with a stepwise ration, in per se known manner.

The base portion 12 has a plurality of pairs of transverse rib portions 20, the transverse rib portions 20 of each pair being aligned with each other in the transverse direction of the base portion to provide a respective transverse rib means. The transverse rib means provided by the pairs of transverse rib portions 20 are disposed at spacings from each other i-n the longitudinal direction of the base portion to provide therebetween respective compartments 22, each for accommodating a respective slide frame. It will be seen for example from FIG. 1 that the transverse rib portions 20 constituting a respective transverse rib means are separated from each other, with a spacing therebetween.

Projecting laterally away from each transverse rib portion 20 on the base portion 12 are projections 24 which are arranged to engage into groove configurations provided on the respective CS-slide frame and which extend along the peripheral edge thereof. In that way the slide frame can be retained in an at least spill-resistant fashion in a respective one of the compartments 22 of the slide magazine 10.

The base 12 is further provided with spaced-apart resilient fingers 26, with a respective finger 26 being operatively associated with each compartment 22. Each finger 26 has thereon an upwardly projecting retaining nose as indicated at 28. The retaining noses 28 on the resilient fingers 26 are arranged one behind the other in the longitudinal direction of the slide magazine 10 and are aligned with each other, the retaining noses 28 forming the axis of symmetry of the slide magazine 10 in the longitudinal direction thereof.

Reference numeral 30 in FIG. 1 identifies a terminal end wall of the slide magazine 10.

The retaining noses 28 serve for engagement into a notch provided at the middle of each edge portion of each respective CS-slide frame, as will be described in greater detail hereinafter, and they consequently serve to secure the slide frame disposed in a respective compartment 22, to prevent undesired lateral displacement thereof. However the resilient fingers 26 on which the retaining noses 28 are disposed have a degree of elasticity such that, after a defined lateral displacement force has been applied to the corresponding slide frame, it is possible for that slide frame to be pushed out of the slide magazine 10, at either one of the two sides thereof.

In order to prevent unintentional tilting movement of the slide frames retained in the slide magazine 10, about the projections 24, that is to say, in the longitudinal direction of the slide magazine 10, the slide magazine 10 further includes a plurality of retaining ribs indicated at 32 in FIGS. 1 and 2, which project upwardly away from the respective transverse ribs portions 20. The retaining ribs 32 additionally define the individual compartments 22 of the slide magazine 10, that is to say, they provide a defining wall for each compartment 22, which extends away from the base portion 12 to a greater degree than the respective transverse rib portions 20. As is clearly apparent from the drawings, each retaining rib 32 is of a widthwise dimension, as measured in the transverse direction of the base portion 12, which is less than the length of the corresponding transverse rib portion 20. It will be apparent from for example FIGS. 1 and 4 that each retaining rib 32 and the associated transverse rib portion 20 aligned therewith each form a respective common outside edge as indicated at 34 which is preferably of an at least substantially knife edge-like configuration.

Figure 3:
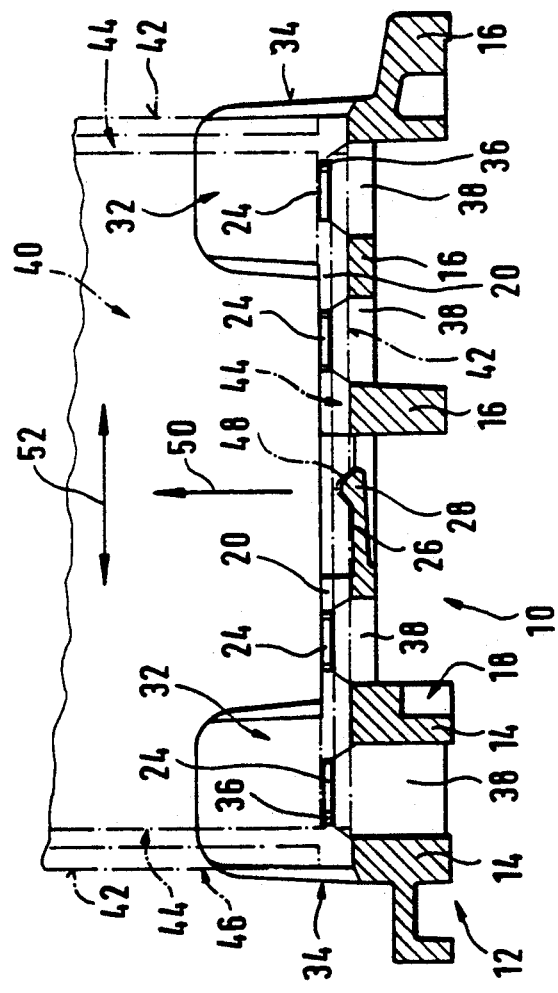
FIG. 3 is a view in section through the slide magazine taken along section line III—III in FIG. 1, also indicating in thin dash-dotted lines a part of a CS-slide frame which is held in a spill-resistant fashion in the slide magazine.
Figure 4:
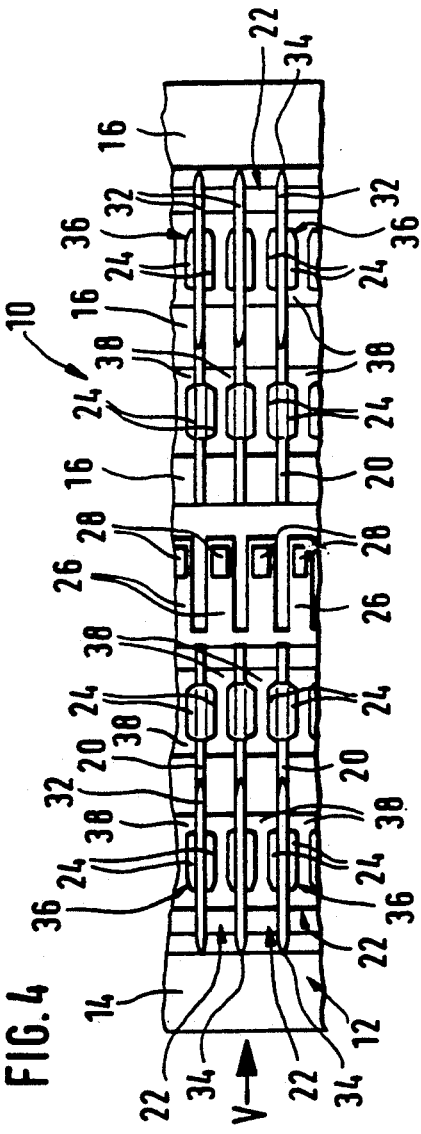
FIG. 4 shows a view of a part of the slide magazine from above.

Reverting at this point to the above-mentioned projections 24, it will be seen for example from FIGS. 1, 3 and 4 that each transverse rib portion 20 is provided, on each side thereof, with first and second spaced-apart laterally projecting projections 24. One such projection 24 is provided as by molding on the transverse rib portion 20 in the region of the associated retaining rib 32 while the other projection 24 is in the region of the part of the corresponding transverse rib portion 20, which does not have the retaining rib 32 thereon. Each projection 24 disposed in the region of the associated retaining rib 32 has a bevel or chamfer as indicated at 36 in FIGS. 1, 2 and 4, in its end part which is towards the outside edge 34 of the transverse rib portion 20 and retaining rib 32. The bevel 36 diverges into the respective corresponding compartment 22, as is clearly apparent for example from FIG. 4.

It will also be clearly apparent from for example FIG. 4 that each projection 24 disposed in the region of the associated retaining rib 32 is displaced inwardly of the slide magazine in the transverse direction thereof, relative to the corresponding outside edge 34 of the respective transverse rib portion 20 and retaining rib 32. So that the projections 24 which project laterally away from the transverse rib portions 20 in the longitudinal direction of the slide magazine 10 can be readily molded, the base portion 12 of the slide magazine 10 has suitable openings indicated at 38, for appropriate mold insert members.

Reference will now be made to FIG. 3 which also shows in thin dash-dotted lines a part of a. CS-slide frame as indicated generally by reference numeral 40. The slide frame 40 rests with an end edge portion 42 thereof on the base portion 12 of the slide magazine 10. Reference numeral 44 identifies the peripherally extending groove configuration, which extends around the peripheral edge 46 of the slide frame 10, in the vicinity of each edge portion 42. FIG. 3 also shows the above-mentioned middle notch 48 with which the slide frame 40 is provided at the middle of each edge portion 42. The retaining nose 28 of a respective resilient finger 26 of each compartment of the slide magazine 10 is engaged into the respective notch 48 in the edge portion 42 which bears against the base portion 12 of the slide magazine, in the respective compartment. The projections 24 are engaged into the corresponding groove configurations 44. The projections 24, by being engaged into the groove configurations 44, prevent the slide frame 40 from falling out of the slide magazine 10 in the direction indicated by the arrow 50. The retaining nose 28 on the finger 26, which is engaged into the notch 48 in the slide from 40, prevents the slide frame 40 from being unintentionally laterally displaced in the directions indicated by the double-headed arrow 52. As a result, the individual slide frame 40 is retained overall in the slide magazine 10 in an unlosable or at least substantially spill-resistant fashion. It is nonetheless possible for the slide frame 40 to be put into and removed from the slide magazine 10 at either side thereof. The slide magazine 10 is therefore suitable, as already mentioned, for use with the above-mentioned slide projector involving a blending and mixing operating procedure.

It will be appreciated that the above-described slide magazine has been set forth solely by way of example and illustration of the principles of the present invention and that various modifications and alterations may be made therein without thereby departing from the spirit and scope of the present invention.

What is claimed is:

1. In a slide magazine for slide frames having a peripheral edge having peripherally extending grooves and a notch at the peripheral edge, the slide magazine comprising: a base portion; transverse ribs disposed on the base portion and spaced from each other to form compartments for accommodating respective slide frames, each transverse rib having at least one projection which projects laterally therefrom and is adapted to engage into a groove of the respective slide frame; spaced-apart resilient fingers arranged on the base portion, each finger being associated with a respective compartment and having an upwardly projecting retaining nose for engagement into a notch of the respective slide frame; and retaining ribs disposed on the base portion and projecting upwardly therefrom in alignment with the transverse ribs for holding the respective slide frames in a spill-resistant manner in the slide magazine; the improvement that the slide magazine is provided with transverse ribs arranged on said base portion in a transverse direction and separate from each other, and between which are disposed corresponding retaining noses of respective compartments; the retaining noses being aligned with each other in a longitudinal direction of the slide magazine and defining an axis of symmetry along which the transverse ribs are arranged, each transverse rib being disposed in a transverse direction to said axis of symmetry, said upwardly projecting retaining ribs being arranged on said transverse ribs to either side of said axis and providing common outside edges with said transverse ribs, said outside edges having a knife-edge configuration.

2. A magazine as set forth in claim 1 wherein each retaining rib as measured in the transverse direction of the slide magazine is of a widthwise dimension which is smaller that the length of the corresponding transverse rib, whereby said transverse rib has a region having an associated retaining rib and a region free of a retaining rib.

3. A magazine as set forth in claim 2, wherein each transverse rib has first and second spaced-apart projections arranged on each side and projecting therefrom one being in the region of the associated retaining rib and the other in the region of the transverse rib which is free of the retaining rib.

4. A magazine as set forth in claim 3 wherein each projection in the region of the associated retaining rib has a bevel at an end part facing an outside edge of the transverse rib portion and the retaining rib.

5. A magazine as set forth in claim 4 wherein each said projection which is disposed in the region of the associated retaining rib is displaced inwardly of the slide magazine relative to the corresponding outside edge of the transverse rib and the retaining rib.

6. A slide magazine for slide frames having a peripheral edge having peripherally extending grooves and a notch at at least one edge portion of the peripheral edge, the slide magazine comprising: an elongate base portion; a plurality of rib means which extend transversely of the base portion and which are disposed at spacings from each other in the longitudinal direction of the base portion to form compartments for accommodating respective slide frames, each said transverse rib means comprising first and second rib portions which are separated from each other in the transverse direction of the base portion and each transverse rib portion having at least one projection which projects laterally therefrom and which is adapted to engage into said groove configuration of the respective slide frame; a plurality of resilient fingers disposed on the base portion at spacings from each other in the longitudinal direction of the base portion, each finger being operatively associated with a respective compartment; a retaining nose on each said resilient finger and projecting away from said base portion for engagement into said notch of a respective slide frame, the retaining nose of each compartment being disposed between the respective rib portions thereof and the retaining noses being aligned with each other in the longitudinal direction of the slide magazine to form an axis of symmetry along which the transverse rib portions are arranged; and retaining ribs disposed on respective oppositely disposed transverse rib portions and aligned therewith and projecting away from the base portion for holding the respective slide frames in the slide magazine in an at least substantially spill-resistant manner, said retaining rib and associated rib portion having a common outer edge having a knife-edge configuration.

7. A magazine as set forth in claim 1, wherein said transverse ribs and associated retaining ribs define said compartments having outwardly facing open ends on each side of said axis of symmetry, whereby respective slide frames can be inserted into sand removed from respective compartments from either of said open ends.

* * * * *